United States Patent [19]

Hu

[11] Patent Number: 5,381,495
[45] Date of Patent: Jan. 10, 1995

[54] OPTICAL FIBER COUPLER OR ATTENUATOR AND METHOD OF USE THEREOF

[75] Inventor: Andog Hu, Carlsbad, Calif.

[73] Assignee: Tacan Corporation, Carlsbad, Calif.

[21] Appl. No.: 943,780

[22] Filed: Sep. 11, 1992

[51] Int. Cl.$^6$ .............................................. G02B 6/40
[52] U.S. Cl. .................................. 385/51; 385/73; 385/74; 385/80; 385/54
[58] Field of Search ................. 385/51, 54, 44, 45, 385/46, 73, 74, 70, 33.71, 34.8

[56] References Cited

U.S. PATENT DOCUMENTS

| | | | |
|---|---|---|---|
| 3,455,625 | 6/1966 | Bromley et al. | 385/54 |
| 3,861,781 | 1/1975 | Hasegawa et al. | 385/80 |
| 3,912,364 | 10/1975 | Hudson | 385/46 |
| 4,011,005 | 3/1977 | Hawkes et al. | 385/46 |
| 4,078,852 | 3/1978 | Lebduska | 385/44 X |
| 4,291,940 | 9/1981 | Kawasuki et al. | 385/50 |
| 4,291,941 | 9/1981 | Melzer | 385/74 |
| 4,563,057 | 1/1986 | Ludman et al. | 385/74 |
| 4,632,505 | 12/1986 | Allsworth | 385/74 X |
| 4,632,513 | 12/1986 | Stowe et al. | 385/43 |
| 4,718,746 | 1/1988 | Chrepta | 385/74 |
| 4,772,085 | 9/1988 | Moore et al. | 385/43 |
| 4,798,438 | 1/1989 | Moore et al. | 385/11 X |
| 4,898,450 | 2/1990 | Jannson et al. | 385/50 |
| 4,913,508 | 4/1990 | Blyler, Jr. et al. | 385/74 |
| 4,923,268 | 5/1990 | Xu | 385/43 |
| 5,016,963 | 5/1991 | Pan | 385/43 X |

FOREIGN PATENT DOCUMENTS 0028037  2/1980  Japan ........................ 385/74

OTHER PUBLICATIONS

J. Hecht, *Understanding Fiber Optics*, Ch. 8 (1990)*, pp. 151-170, 2nd Edt no month available..

*Primary Examiner*—Rodney B. Bovernick
*Assistant Examiner*—Hemang Sanghavi
*Attorney, Agent, or Firm*—Brown, Martin, Haller & McClain

[57] ABSTRACT

An optical fiber coupler and its method of use are disclosed. In the coupler a centrally located lens is disposed between the ends of the source and outlet optical fibers, the fibers themselves are formed into the most spacing filling configuration at their ends adjacent the lens, and the lens and fiber ends are secured with an adhesive. The lens, fibers and adhesive will all have substantially equivalent indices of refraction so that there is no excessive light attenuation through the lens and adhesive layers. The optical fibers may be glass or polymer, be single or multiple mode, and have uniform, step or graded refractive indices. A wide variety of combinations of fiber bundles, from single fibers to bundles of up to 128 or more fibers, can be coupled through this device. In its method of use aspect, the received fibers are inserted into the sleeve and adhered to the lens with the adhesive, while venting trapped air and excess adhesive.

17 Claims, 1 Drawing Sheet

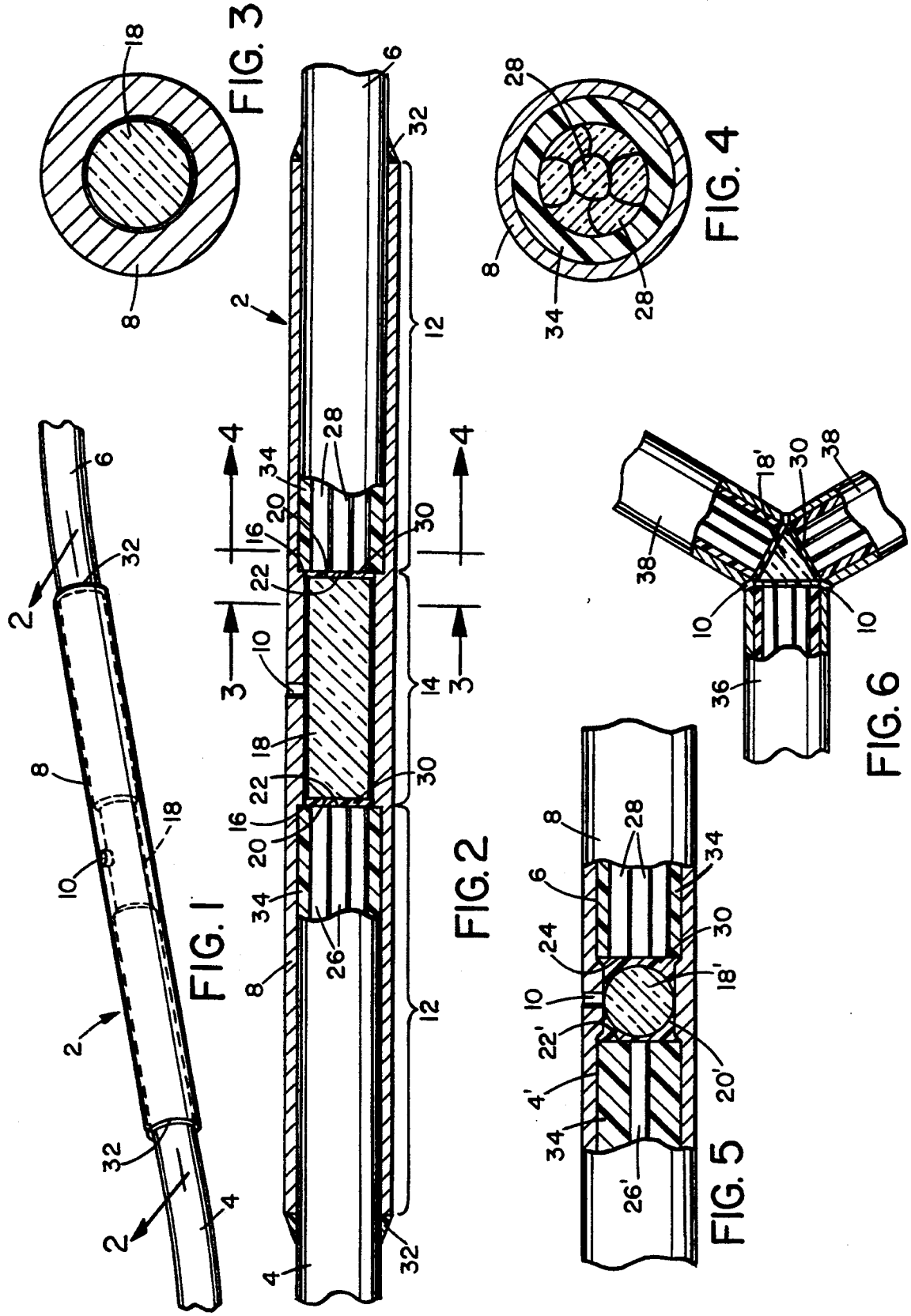

OPTICAL FIBER COUPLER OR ATTENUATOR AND METHOD OF USE THEREOF

BACKGROUND OF THE INVENTION

1. Field of the Invention

The invention herein relates to couplers and attenuators for light transmitting optical fibers. It further relates to a novel method for the use of such couplers and attenuators.

2. Description of the Prior Art

Fiber optic light transmission over any significant distance or in a system with branches invariably requires that the optical fibers be coupled together. In the past this coupling has been accomplished in one of two ways.

Where the fibers are to be joined end-to-end, as in an extended cable, past practice has been to fabricate optically smooth parallel faces on the ends of the adjacent fibers and then butt the fiber ends together in precise alignment. Prior art couplers for this purpose have therefore been structured primarily to maintain the precise alignment of the fibers, since any misalignment substantially reduces the efficiency of the light transmission from the input fibers to the output fibers. See Hecht, *Understanding Fiber Optics,* Chapter 8 (1987). These types of couplers are rarely entirely satisfactory. Alignment of single fibers end-to-end is difficult and misalignment is common. When there are matching fiber bundles containing pluralities of fibers to be aligned end-to-end, the alignment problems are multiplied, and correct alignment of all of the fiber pairs simultaneous is virtually impossible. In addition, the abutting optical surfaces at the ends of the fibers are rarely precisely parallel, so that when the fibers are butted together the opposing surfaces are usually not in contact over their entire surface areas.

Further, the "butted fiber" couplers are not capable of coupling two bundles of fibers where the fiber counts of the two bundles differ, unless the overall end surface area of the two abutting bundles is approximately equal, such as where the individual fibers in the lower fiber count bundle are of greater diameter than the fibers in the other bundle. However, since the number of fibers in the two bundles are still different, there will be fiber end surfaces in each bundle which are not aligned with fiber end surfaces of the other bundle, thus reducing the effectiveness of the light transmission.

End-to-end abutment is also used for branching coupling, but accurate end surface contact and alignment has been impossible to obtain. Usually the problem has been addressed not by a coupler, but rather by terminating each fiber in a rounded end to distribute light. The light from the terminated upstream fibers is then passed through one or more external lenses, which redirect portions of the light to the receiving ends of the various downstream fibers. Efficiency of transmission is poor, and misalignment of or damage to the external lens system is frequent.

Both of these types of problems are also described in the aforementioned Hecht reference.

In order to overcome these difficulties, a number of coupler systems have been proposed in which the input and output optical fibers are not butted end-to-end but rather overlap each other and are aligned in parallel. Any cladding of the fibers is removed over a portion of the fibers' length where they are adjacent. The fibers are then twisted and/or melted together or forced into contact by shrink-wrapping of tubing around the fibers, so that light is transmitted through the sides of the contacting fibers or through the homogenous melted fiber mass rather than through the ends of the fibers. Typical of such systems are those shown in U.S. Pat. Nos. 4,291,940; 4,632,513; 4,772,085 and 4,923,268.

Such systems have been some improvement in that they permit both end-to-end transmission of light and branching transmission of light, as well as joining of fiber bundles of slightly different fiber counts. However, these systems have also not been particularly satisfactory, since twisting or melting of the fibers is normally accompanied by physical damage or undesirable physical characteristic changes which adversely affect the efficiency of the light transfer. In addition, such systems (particularly those using melting or shrink-wrapping) normally require special equipment for heating the fibers or the shrink-wrap. Such equipment is often not readily available, particularly in the field, and in any case is usually cumbersome and difficult or dangerous to use, particularly when fiber optic cables are to be spliced in cramped or confined quarters.

It would therefore be of considerable interest to have a fiber optic coupling device and a method of using that coupling which would allow fast, secure and effective means for joining two or more optical fibers to produce highly effective light transmission. It would also be advantageous for such coupler to permit the joining of fiber bundles of any fiber count, including bundles of quite different fiber count, regardless of the actual physical diameters of the opposing end surfaces of the fiber optic bundles to be joined.

SUMMARY OF THE INVENTION

The invention herein, in its device aspect, is an optical fiber coupler in which a centrally located lens is disposed between the ends of the source and outlet optical fibers, the fibers themselves are formed into the most spacing filling configuration at their ends adjacent the lens, and the lens and fiber ends are secured with an adhesive. The lens, fibers and adhesive will all have substantially equivalent indices of refraction so that there is no excessive light attenuation through the lens and adhesive layers. The optical fibers and lens may be glass or polymer, be single or multiple mode, and have uniform or graded refractive indices. A wide variety of combinations of fiber bundles, from single fibers to bundles of up to 32 or more fibers, can be coupled through this device.

In particular, the device aspect of the invention an optical fiber coupler comprising an elongated sleeve having a axial opening therethrough, the opening having fiber receiving portions at each end thereof, each of the fiber receiving portions being configured to receive and retain a terminal end of at least one optical fiber, a terminal end of which has a radial cross-sectional shape which conforms substantially to the cross-sectional shade of the opening; a lens disposed within the opening between the fiber receiving portions and in light communication therewith, the lens having an index of refraction substantially equivalent to that of optical fibers received in the fiber receiving portions; an adhesive to secure the lens to each of the terminal ends of the received optical fibers, the adhesive having an index of refraction substantially equivalent to that of the lens and the received optical fibers; and means for retaining the received optical fibers and the lens in position within the opening. In various embodiments the optical fiber coupler has one or more of the received optical fibers comprising a plurality of bundled optical fibers disposed in parallel and having aligned terminal end portions, the terminal end portions being shaped such that the outer fiber surface of the terminal end portion of each of the fibers extended surface contact with terminal end portions of neighboring fibers.

The invention also has a method of use aspect, in which the received fibers are inserted into the sleeve and adhered to the lens with the adhesive, while venting trapped air and excess adhesive.

More particularly, the method aspect is a method for incorporating optical fibers into an optical fiber coupler and securing the fibers therein in light transmissive configuration, which comprises providing a coupler in the form of a sleeve with an axial opening therethrough and with fiber receiving portions at each end of the opening and a lens disposed within the opening between the fiber receiving portions and in light communication therewith, the lens having an index of refraction substantially equivalent to that of optical fibers received in the fiber receiving portions; forming a terminal end portion of each of at least two optical fibers into a cross-sectional shape substantially equivalent to the cross-sectional shape of the fiber receiving portions; inserting each of the shaped terminal end portions into a respective fiber receiving portion of the opening to a position where each the terminal end of each of received optical fibers is immediately adjacent to a surface of the lens; adhering the surface of the lens to each of the terminal ends of the received optical fibers with an adhesive having an index of refraction substantially equivalent to that of the lens and the received optical fibers; and retaining the received optical fibers in the fiber receiving portions of the opening. In further embodiments, the method also comprises having at least one of the at least two received optical fibers comprise a plurality of bundled optical fibers disposed in parallel and having aligned terminal ends, and shaping the terminal end portions such that the outer fiber surface of the terminal end portion of each of the fibers is in extended surface contact with terminal end portions of neighboring fiber.

BRIEF DESCRIPTION OF THE DRAWINGS

FIG. 1 is a perspective view of a typical optical fiber coupler of the present invention.

FIG. 2 is an enlarged sectional view taken on line 2—2 of FIG. 1.

FIG. 3 is an enlarged sectional view taken on line 3—3 of FIG. 2.

FIG. 4 is an enlarged sectional view taken on line 4—4 of FIG. 2.

FIG. 5 is a view similar to a portion of FIG. 2, showing an alternative lens configuration.

FIG. 6 is a view similar to FIG. 5, showing an embodiment in which light passing through the coupler is split into or combined from different fiber pathways or, alternatively, in which the coupler serves as a wavelength division multiplexer.

DETAILED DESCRIPTION AND PREFERRED EMBODIMENTS

In the description below, reference will be made to "M×N" fiber couplers. In such descriptions M indicates the number of fibers in the light inlet optical fiber bundle and N indicates the number of fibers in the outlet fiber bundle. Both M and N are integers of at least 1 and typically each can be up to 128 or greater. M and N may or may not be equal. Because of the geometry involved in the convention collection of fibers into fiber bundles with generally round or elliptical cross sections, M and N are usually in the range of 1-7. Above 7, bundle configurations of 16, 19, 32 or 64 fibers are common geometries. (When M and N are both 1—i.e., when M×N is the 1×1 configuration—coupling devices are often termed "attenuators" rather than "couplers." However, for brevity herein, I will use the term "coupler" for all configurations, including the 1×1 configuration. It will be understood by those skilled in the art, of course, that the 1×1 configuration is included within the scope of this invention, whether labelled a "coupler" or an "attenuator.")

The coupler of the present invention is best understood by reference to the drawings. FIG. 1 shows an overall view of the coupler 2 which is shown as joining two optical fiber cables 4 and 6. One viewing the coupler 2 in use as shown in FIG. 1 would see only the outer surface of the sleeve 8 and perhaps vent hole 10 (as will be described below). The outer surface of the coupler may, if desired, be colored, have written information printed or laser engraved on it or contain other indicia as required or desired. It will be preferred that any indicia be printed or laser engraved on the surface rather than being stamped or mechanically cut into the surface, since the latter is likely to distort the inner surface of the sleeve 8 and adversely affect the insertion of the optical fibers 4 and 6 and the transmission of the light.

The critical internal structure of the coupler of this invention is illustrated in FIG. 2. Sleeve 8 is a hollow casing having an axial opening extending all the way through. The casing can be considered to be divided into three portions, two end portions 12 and a central portion 14. In the preferred embodiment shown, sleeve 8's wall thickness in portions 12 is shown to be thinner than its wall thickness in central portion 14. Commonly the inside diameter of the sleeve 8 in the two end portions 12 will be identical, so that the fiber optic cables 4 and 6 can be inserted interchangeably from either end. However, if it is desired to use a coupler of this type to join optical cable of different diameters, the inside diameters of the two portions 12 can be different and the outside of the sleeve 8 will be suitably marked to identify the inside diameter at each end. It is preferred that the inside diameter be changed rather than widening the sleeve for the outside diameter, since by maintaining an equal outside diameter the coupled cable and the coupler can be threaded through conduit or placed in crowded surroundings without causing snagging or interference with adjacent lines.

By increasing the wall thickness of the central section 14 to form a smaller inside diameter, one forms an internal annular shoulder 16 at the junctions between the central portion 14 and the two end portions 12. The shoulder 16 serves as a stop for the cables 4 and 6 when they are inserted so that they and lens 18 will be properly positioned for optimum performance.

Alternatively, the inside diameter of sleeve 18 may be uniform throughout its length. However, care must then be taken to insure that lens 18 is substantially centrally positioned and that cables 4 and 6 are inserted to about the same depths, to have the desired coupling. Since such precise positioning is somewhat difficult, especially where the coupler is being used to splice cable in cramped surroundings, this configuration is not preferred.

Yet another configuration also has a uniform inside diameter of sleeve 8, but involves pre-positioning of the lens 18 before use of the coupler 2 and securement of the lens 18 in that position by adhesive. While this avoids some of the problems mentioned in the preceding paragraph, it is still less preferred since it is more difficult to position and secure the lens 18 than simply to fabricate the sleeve 8 with the shoulders 16, and the pre-positioned lens 18 is subject to dislodging despite securement if the coupler is roughly handled or the adhesive bond is poor.

As noted, centrally located in the sleeve 8 is lens 18, shown in FIG. 2 as having a cylindrical configuration. The end surfaces 20 of lens 18 are closely adjacent to and aligned with end surfaces 22 and 24 of cables 4 and 6 respectively. In the configuration shown in FIG. 2, end surfaces 20, 22 and 24 are all machined to flat surfaces and are essentially parallel. (Also possible is a concave/convex mating surface configuration, but such is difficult to form and unnecessary. It may also be inferior in light transmission properties to the much simpler parallel flat surfaces shown.) The index of refraction (n) of the lens 18 will be substantially equivalent to that of the optical fibers 26 and 28. As will be discussed below, this will usually be insured by having the material from which lens 18 is made be the same material as that from which optical fibers 26 and 28 are made, but that is not necessary as long as the lens material and the fiber materials have substantially the same index of refraction.

Lying between the adjacent surfaces 20/22 and 20/24 are layers 30 of an adhesive which firmly bonds the adjacent surfaces 20/22 and 20/24 to each other to secure the lens 18 and fibers 26 and 28 in a unitary optical path. As will be discussed below, the adhesive must be one which also has essentially the same index of refraction as the lens 18 and the fibers 26 and 28 so that no substantial loss occurs through the adhesive 30.

The configuration shown in FIG. 2 is most appropriate when the values of M and N for fiber count are substantially equivalent, such as 1×1, 1×2, 7×7, 16×19, etc. It will also be appropriate when M and N are not equal but the fiber diameters of the lower count bundle are substantially larger than those of the higher count bundle so that the end surface areas 22 and 24 are similar. Thus, for instance, a 1×7 coupler could use a cylindrical lens where the single fiber (M) is large and has a end surface area substantially equivalent to the total end surface of the seven-fiber bundle (N).

An alternate configuration is shown in FIG. 5. In this case, the lens is a spherical shaped ball lens designated 18'. It is preferably used when the overall end surface area of the optical fibers of one cable is substantially different than the overall end surface area of the other. In this case, a cable 4' is shown which has only a single optical fiber 26' of small diameter which terminates in end 22'. Cable 6 and fibers 28 are essentially as shown in FIG. 2, constituting a larger fiber count and a larger surface area 24. This configuration might typically be 1×7, 1×19 or the like. Normally, the smaller count cable (M) is the light source cable. When the light from the cable 26' strikes the ball lens 18', it is dispersed and spread to the plurality of the fibers 28. The ball lens 18' thus more effectively passes the light to all of the target fibers 28 than would a cylindrical lens 18. The ball lens 18' will also have an index of refraction equivalent to that of the fibers 26' and 28 and will be secured to them by the adhesive 30, which also has an equivalent index of refraction.

It will be seen from FIGS. 2 and 5 that the fit of the cables 4 and 6 within the sleeve 8 is a relatively tight fit. The fit will be a clearance fit in order to allow the cables 4 and 6 to be inserted without undue effort and without strain on the cables, but the amount of clearance will be small to ensure that the cables remain in place without any significant vibration. Preferably the clearance will be close to zero, so that the outside of the cables 4 and 6 will be in light frictional engagement with the inner surface of sleeve 8 at a number of points. Alternatively one can incorporate a layer of adhesive (not shown) along the outside of the surface of the cables 4 and 6 which would adhere the cables to the inside surface of sleeve 8; the amount of clearance would then be adjusted to permit space for the adhesive layer. Alternatively, an adhesive 32 can be placed in an annular ring around the end of the sleeve 8 to secure the cables 4 and 6 in place and to provide strain relief. The adhesive 32 also provides a transition surface which allows the coupled cable to slide readily through a conduit.

The fit of cables 4 and 6 within sleeve 8, while a clearance fit, is still sufficiently tight that it is difficult for air to escape when the cables are being inserted. Consequently, it is preferred to provide vent hole 10 to allow for escape of air and excess adhesive 30 during assembly. After assembly, the vent hole 10 may remain open or, if desired, it may be sealed with extra adhesive, a plug, or simply covered by tape, a label or other covering.

An important aspect of the present invention is the shape of the optical fibers within the cables 4 and 6 through the length of the end portions 12, which is illustrated in FIG. 4. In the past, fibers within a coupler have been simply laid side-by-side within their bundle or cable, other than where they were twisted or melted together. See, for instance, the previously mentioned U.S. Pat. No. 4,923,268. Since fibers are normally circular and close packing theory dictates that abutting circles must necessarily leave interstices between them, significant loss of light transmission has occurred in prior art couplers, as noted above, since some of the light passing from one cable to the other will necessarily impinge on the interstices where the target optical fibers do not abut. In the present invention, therefore, the fibers in their terminal lengths (e.g., terminal 2–3 mm) within the portions 12 will be compressed and shaped as shown in FIG. 4 so that no interstices remain between them and that all outer fiber surfaces are in contact with either other fiber surfaces or the inner surface of the bundle or cable metal sheath 34. This can be accomplished by allowing the ends of the fibers to extend slightly beyond the end of the sheath 34 and then mildly heating the fiber ends to soften the fiber material sufficiently to permit easy compression and shaping into the terminal end portion of the sheath 34. This configuration is significantly different from any of the prior art configurations. Compare the configuration shown in the previously mentioned U.S. Pat. No. 4,923,268 in which the fibers remain circular and the interstices between them are clearly evident. Moreover, it is also significantly different from the molten fiber cables shown in the above mentioned U.S. Pat. Nos. 4,632,513 and 4,772,085. The fibers here are not melted together, but are merely softened sufficiently that they can be pressed into abutting relationship at their ends so that all of the light transferred will fall on optically active ends of fibers rather than on inactive (often polymer-filled) interstices. Since the fibers are not melted or joined together to any significant degree, each carries its own light path and retains it own internal reflection for transmission purposes. Of course, if there is only a single fiber as shown at 26' in FIG. 5, it will not be distorted in shape, but the sheath 34 will be of sufficient thickness to completely fill the interior of the cable other than where the optical fiber itself is positioned. Similarly, the sheath 34 in a multi-fiber cable such as in FIG. 3 will also fill the gap between the outer surfaces of the fibers and the outside of the cable itself.

An alternative configuration showing a coupler which can serve as a splitter or combiner for light is shown in FIG. 6. The example shown uses a prismatic lens 18' to allow the light to be turned in its path between the single cable 36 and the paired cables 38. If the single cable 36 is the source cable, then the device functions as a light splitter; conversely, if the paired cables 38 are the sources, then the device functions as a light combiner. It may be possible to have other than the a 1:2-cable configuration shown, such as for instance 2:2 or 1:3, if an appropriate shape of lens (such as spherical or prismatic) is chosen. It is also possible to use a combination of lenses in this type of configuration (or in the other coupler configurations as well) to serve to focus light or to direct the path into one of the split paths.

The configuration of FIG. 6 may also be used as a wavelength division multiplexer. Dual-wavelength light can enter through the single source cable 36 and the light split into separate light rays of single wavelength, with each wavelength being routed to different one of the outlet cables 38. Alternatively, the cables 38 can each be the source for light of a distinct single wavelength and the different wavelength light rays can be conbined into a dual wavelength ray leaving through outlet cable 36.

Any conventional type of optical fiber may be used in the present invention, including those made from glass or from polymers, such as polymethyl methacrylate. A wide variety of glass and polymeric fibers are described in Hecht, supra., and Safford, et al., *Fiber Optics and Laser Handbook* (2d edn.: 1988). The fibers may be those which transmit either or both visible or ultraviolet light, and may be single mode or multi-mode fibers. One may also use fibers with a uniform index of refraction or fibers with step or graded indices of refraction, in which the index of refraction varies over the fiber diameter. As is described in the above-cited Hecht and Safford et al. references, there are a number of considerations of which those skilled in the art will be aware in the selection of fiber materials and properties, such as temperature and vibration resistance, cost, fiber flexibility, allowable light attenuation and the like. The particular fibers to be selected for any specific application will be well within the skill of those familiar with the technology and will be based on the specific parameters of the intended use. For instance, excellent results may be obtained with polymeric optical fibers commercially available under the trade name "TORAY" from Tobay Industries, Inc. (Parts No. PF-U-FB1000 and PG-U-FB1000) and "ESKA" from Mitsubishi Rayon Company (Part No. SK-40).

As noted above, it is most common that the lens will be made out of the same material as the optical fibers, normally glass or a corresponding polymer. However, the lens and fibers do not necessarily need to be made of the same material as long as their indices of refraction are substantially equivalent. In the context of this invention, this means that the index of refraction of the lens is sufficiently close in value to the index of refraction of the optical fibers that the amount of light attenuation caused by the difference in the indices is sufficiently low to be acceptable to the system designer within the overall design and intended end use of the system in which the coupler is placed. A typical lens which may be used is one available commerically under the trade name "SELFOC" from NSG America, Inc. (Nos. SLN, SLS, SLW and SLH).

The nature of the adhesive used is critical. Many adhesives do not have sufficient optical clarity or an appropriate index of refraction to be useful in the present invention. I have found, however, that there are a number of epoxy resins with good optical clarity and acceptable index of refraction to be useful in the present invention. Typical examples include epoxy resins commercially available under the trade designations "EPO-TEK 301" from Epoxy Technology, Inc., and "EP-30" (a two component epoxy) from Master Bond, Inc. Those skilled in the art will be aware of other adhesives, both epoxies and other polymers, which will meet the optical clarity, index of refraction and adhesive property requirements of the present invention. As described above for the lens, an acceptable index of refraction for the adhesive will mean that any differences among the indices of refraction of the adhesive, the lens and the optical fibers will be sufficiently small that the amount of attenuation which occurs through the adhesive will be acceptable within the requirements of the overall system.

It will be evident to those skilled in the art that there are numerous embodiments of this invention which, while not specifically described above, are clearly within the scope and spirit of the invention. The above description therefore is to be considered exemplary only, and the scope of the invention is to defined solely by the appended claims.

I claim:

1. An optical fiber coupler comprising:
   an elongated sleeve having an axial opening therethrough, said opening having fiber receiving portions at each end thereof, each of said fiber receiving portions being configured to receive and retain a terminal end of at least one optical fiber, a terminal end of which has a radial cross-sectional shape which conforms substantially to the cross-sectional shape of said opening;
   a lens disposed within said opening between said fiber receiving portions and in light communication therewith, said lens having an index of refraction substantially equivalent to that of optical fibers received in said fiber receiving portions;
   at least one of said received optical fibers comprising a plurality of bundled optical fibers disposed in parallel juxtaposition and having aligned terminal end portions, said terminal end portions being shaped such that the outer fiber surface of said terminal end portion of each of said fibers is in extended surface contact with terminal end portions of neighboring fibers;
   a first adhesive to secure said lens to each of said terminal ends of said received optical fibers, said first adhesive having an index of refraction substantially equivalent to that of said lens and said received optical fibers, and said first adhesive substantially completely filling all space between said lens and said terminal ends of said received optical fibers;

means for venting air from the interior of said opening during insertion of said received fibers; and means for retaining said received optical fibers and said lens in position within said opening.

2. An optical fiber coupler as in claim 1 wherein each of said received optical fibers comprises a plurality of bundled optical fibers disposed in parallel juxtaposition and having aligned terminal end portions, said terminal end portions being shaped such that the outer fiber surface of said terminal end portion of each of said fibers is in extended surface contact with terminal end portions of neighboring fibers.

3. An optical fiber coupler as in claim 2 wherein each of said pluralities of bundled optical fibers comprises 2–128 fibers.

4. An optical fiber coupler as in claim 1 wherein said plurality of bundled optical fibers comprises 2–128 fibers.

5. An optical fiber coupler as in claim 1 wherein said retaining means comprises a second adhesive.

6. An optical fiber coupler as in claim 5 wherein said retaining means comprises said second adhesive positioned between an outer surface of said plurality of bundled optical fibers and an inner surface of said opening.

7. An optical fiber coupler as in claim 5 wherein said second adhesive is of the same composition as said first adhesive used to secure said lens to said terminal ends of said received optical fibers.

8. An optical fiber coupler as in claim 1 wherein said retaining means comprises frictional engagement between an outer surface of said plurality of bundled optical fibers and the inner surface of said opening.

9. An optical fiber coupler as in claim 1 further comprising means in said sleeve for venting air from within said opening.

10. A optical fiber coupler as in claim 1 wherein said lens is composed of the same material as said received optical fibers.

11. A optical fiber coupler as in claim 1 wherein said opening is of lesser diameter in its central portion than in its end portions and an inwardly projecting shoulder exists at the junction of said central portion with each of said end portions, said shoulder serving as a stop for the depth of insertion of said received optical fibers.

12. A method for incorporating optical fibers into an optical fiber coupler and securing said fibers therein in light transmissive configuration, which comprises:

providing a coupler in the form of a sleeve with an axial opening therethrough and with fiber receiving portions at each end of said opening and a lens disposed within said opening between said fiber receiving portions and in light communication therewith, said lens having an index of refraction substantially equivalent to that of optical fibers received in said fiber receiving portions;

forming a terminal end portion of each of at least two opposed optical fibers into a cross-sectional shape substantially equivalent to the cross-sectional shape of said fiber receiving portions;

at least one of said received optical fibers comprising a plurality of bundled optical fibers disposed in parallel juxtaposition and having aligned terminal end portions, and shaping said terminal end portions such that the outer fiber surface of said terminal end portion of each of said fibers is in extended surface contact with terminal end portions of neighboring fibers;

inserting each of said shaped terminal end portions into a respective fiber receiving portion of said opening to a position where each said terminal end of each of said received optical fibers is immediately adjacent to a surface of said lens;

adhering said surface of said lens to each of said terminal ends of said received optical fibers with a first adhesive having an index of refraction substantially equivalent to that of said lens and said received optical fibers, said first adhesive substantially completely filling all space between said lens and said terminal ends of said received optical fibers;

venting air from within said opening during said insertion of said received fiber; and retaining said received optical fibers in said fiber receiving portions of said opening.

13. A method as in claim 12 further comprising each of said at least one received opposed optical fibers comprises a plurality of bundled optical fibers disposed in parallel juxtaposition and having aligned terminal ends, and shaping said terminal end portions such that the outer fiber surface of said terminal end portion of each of said fibers is in extended surface contact with terminal end portions of neighboring fiber.

14. A method as in claim 13 wherein each of said pluralities of bundled optical fibers comprises 2–128 fibers.

15. A method as in claim 12 wherein said plurality of bundled optical fibers comprises 2–128 fibers.

16. A method as in claim 12 wherein said each of said end portions of said received fibers is retained within said opening by a second adhesive.

17. A method as in claim 16 wherein said second adhesive is of the same composition as said first adhesive used to secure said lens to said terminal ends of said received optical fibers.

* * * * *

UNITED STATES PATENT AND TRADEMARK OFFICE
CERTIFICATE OF CORRECTION

PATENT NO. : 5,381,495
DATED : January 10, 1995
INVENTOR(S) : ANDONG HU

It is certified that error appears in the above-indentified patent and that said Letters Patent is hereby corrected as shown below:

On the title page, item [75], change "ANDOG" to --ANDONG--.

Signed and Sealed this

Second Day of May, 1995

Attest:

BRUCE LEHMAN

*Attesting Officer*   *Commissioner of Patents and Trademarks*